US008438422B2

(12) United States Patent
Matsumoto et al.

(10) Patent No.: US 8,438,422 B2
(45) Date of Patent: May 7, 2013

(54) FAILURE RESPONSE SUPPORT APPARATUS AND FAILURE RESPONSE SUPPORT METHOD

(75) Inventors: Yasuhide Matsumoto, Kawasaki (JP); Yukihiro Watanabe, Kawasaki (JP); Kuniaki Shimada, Kawasaki (JP); Keiichi Oguro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 12/275,946

(22) Filed: Nov. 21, 2008

(65) Prior Publication Data

US 2009/0183022 A1 Jul. 16, 2009

(30) Foreign Application Priority Data

Jan. 15, 2008 (JP) ................................ 2008-006037

(51) Int. Cl.
*G06F 11/00* (2006.01)

(52) U.S. Cl.
USPC .............................................. 714/26; 714/46

(58) Field of Classification Search .................... 714/26, 714/46
See application file for complete search history.

(56) References Cited

U.S. PATENT DOCUMENTS

| | | | | |
|---|---|---|---|---|
| 4,964,125 | A * | 10/1990 | Kim | 714/26 |
| 5,161,158 | A * | 11/1992 | Chakravarty et al. | 714/26 |
| 5,483,637 | A * | 1/1996 | Winokur et al. | 714/26 |
| 6,057,757 | A * | 5/2000 | Arrowsmith et al. | 340/506 |
| 6,249,755 | B1 * | 6/2001 | Yemini et al. | 702/183 |
| 6,343,236 | B1 * | 1/2002 | Gibson et al. | 700/79 |
| 6,415,395 | B1 * | 7/2002 | Varma et al. | 714/37 |
| 6,609,217 | B1 * | 8/2003 | Bonissone et al. | 714/26 |
| 6,615,367 | B1 * | 9/2003 | Unkle et al. | 714/26 |
| 6,622,264 | B1 * | 9/2003 | Bliley et al. | 714/26 |
| 6,650,949 | B1 * | 11/2003 | Fera et al. | 700/79 |
| 7,254,515 | B1 | 8/2007 | Ohsie et al. | |
| 7,500,144 | B2 * | 3/2009 | Chessell et al. | 714/26 |

(Continued)

FOREIGN PATENT DOCUMENTS

| | | |
|---|---|---|
| EP | 0 871 126 | 10/1998 |
| JP | 61-114344 | 6/1986 |

(Continued)

OTHER PUBLICATIONS

Japanese Office Action and partial English translation issued in Japanese Application No. 2008-006037 on Jul. 31, 2012.

*Primary Examiner* — Joshua Lohn
(74) *Attorney, Agent, or Firm* — Greer, Burns & Crain, Ltd.

(57) ABSTRACT

A recording medium stores a program which causes a computer to execute a process for responding to failure of a management subject apparatus, based on incident information. The program causes the computer to execute a management procedure. The procedure manages steps of the response to the failure with the incident information. A response knowledge acquisition procedure referring to failure response information in which is described response knowledge corresponding to each step of the response to the failure, and acquires response knowledge for the failure in accordance with the step of the response to the failure managed by the failure response step management procedure with the incident information. A response knowledge process execution procedure executes a process in accordance with the response knowledge for the failure acquired by the response knowledge acquisition procedure.

12 Claims, 16 Drawing Sheets

REPEAT
INCIDENT OPENED
DETERMINE WHETHER MATERIAL NECESSARY FOR CAUSE IDENTIFICATION IS SUFFICIENT
COLLECTED MATERIAL ANALYSIS
NON-RESPONSE SUBJECT FAILURE
CAUSE EXTRAPOLATION
TEMPORARY RESPONSE METHOD SEARCH
CAUSE IDENTIFICATION
RESPONSE DETERMINATION
RESPONSE SUBJECT FAILURE
INCIDENT CLOSED
MATERIAL COLLECTION REQUEST
SUBJECT APPARATUS
MATERIAL
RESPONSE METHOD PRESENTATION

U.S. PATENT DOCUMENTS

| | | | | |
|---|---|---|---|---|
| 2004/0059966 | A1 | 3/2004 | Chan et al. | |
| 2004/0073844 | A1* | 4/2004 | Unkle et al. | 714/39 |
| 2004/0078667 | A1* | 4/2004 | Salem | 714/26 |
| 2005/0283638 | A1 | 12/2005 | Kato | |
| 2006/0174167 | A1 | 8/2006 | Ito | |
| 2008/0065577 | A1* | 3/2008 | Chefalas et al. | 706/47 |
| 2008/0133435 | A1* | 6/2008 | Chintalapti et al. | 706/12 |
| 2008/0168308 | A1* | 7/2008 | Eberbach et al. | 714/26 |
| 2009/0049338 | A1* | 2/2009 | Unnikrishnan et al. | 714/26 |

FOREIGN PATENT DOCUMENTS

| | | |
|---|---|---|
| JP | A 2001-117776 | 4/2001 |
| JP | A 2005-316998 | 11/2005 |
| JP | 2005-346331 | 12/2005 |
| JP | 2006-500654 | 1/2006 |
| WO | WO 94/19912 | 9/1994 |
| WO | WO 03/005200 | 1/2003 |
| WO | WO 2004/010646 | 1/2004 |

* cited by examiner

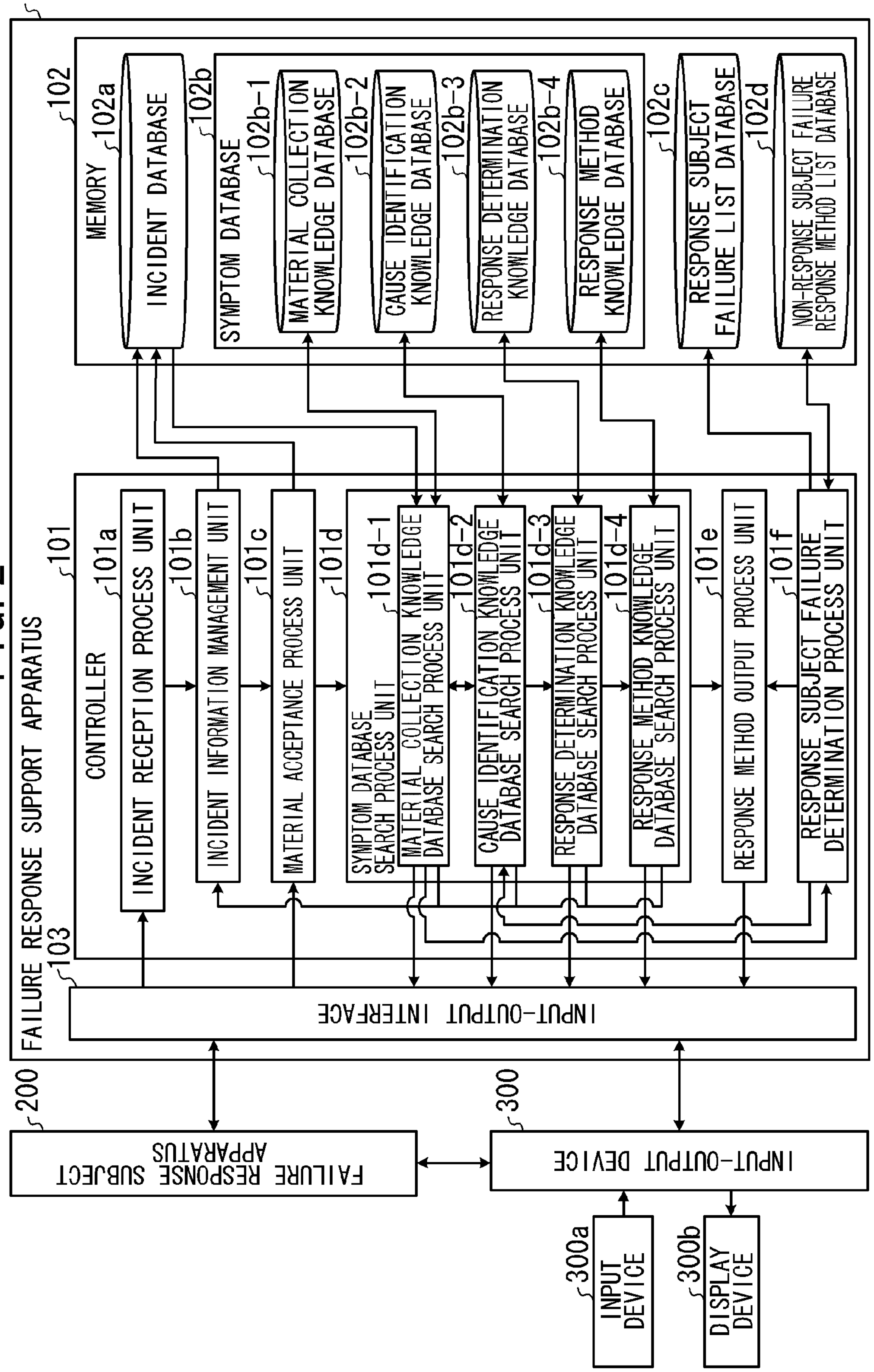
FIG. 2
100
FAILURE RESPONSE SUPPORT APPARATUS
102
MEMORY
102a
INCIDENT DATABASE
102b
SYMPTOM DATABASE
102b-1
MATERIAL COLLECTION KNOWLEDGE DATABASE
102b-2
CAUSE IDENTIFICATION KNOWLEDGE DATABASE
102b-3
RESPONSE DETERMINATION KNOWLEDGE DATABASE
102b-4
RESPONSE METHOD KNOWLEDGE DATABASE
102c
RESPONSE SUBJECT FAILURE LIST DATABASE
102d
NON-RESPONSE SUBJECT FAILURE RESPONSE METHOD LIST DATABASE
101
CONTROLLER
101a
INCIDENT RECEPTION PROCESS UNIT
101b
INCIDENT INFORMATION MANAGEMENT UNIT
101c
MATERIAL ACCEPTANCE PROCESS UNIT
101d
SYMPTOM DATABASE SEARCH PROCESS UNIT
101d-1
MATERIAL COLLECTION KNOWLEDGE DATABASE SEARCH PROCESS UNIT
101d-2
CAUSE IDENTIFICATION KNOWLEDGE DATABASE SEARCH PROCESS UNIT
101d-3
RESPONSE DETERMINATION KNOWLEDGE DATABASE SEARCH PROCESS UNIT
101d-4
RESPONSE METHOD KNOWLEDGE DATABASE SEARCH PROCESS UNIT
101e
RESPONSE METHOD OUTPUT PROCESS UNIT
101f
RESPONSE SUBJECT FAILURE DETERMINATION PROCESS UNIT
103
INPUT-OUTPUT INTERFACE
200
FAILURE RESPONSE SUBJECT APPARATUS
300
INPUT-OUTPUT DEVICE
300a
INPUT DEVICE
300b
DISPLAY DEVICE

FIG. 3

| PERSON IN CHARGE | INCIDENT ID | SYMPTOM | SYMPTOM CATEGORY | STATUS |
|---|---|---|---|---|
| A | 14 | HANG-UP | SYSTEM TROUBLE | CLOSED |
| ⋮ | … | … | … | … |

| SYMPTOM DATABASE SEARCH INPUT-OUTPUT INFORMATION | | | | | | | |
|---|---|---|---|---|---|---|---|
| SEARCH ID | LAYER | MATERIAL | | | SYMPTOM DATABASE SEARCH RESULT | SELECTED SYMPTOM DATABASE | SYMPTOM DATABASE EVALUATION |
| | | MATERIAL ID | MATERIAL NAME | MATERIAL VALUE | | | |
| 25 | HARDWARE | 12 | SYSTEM LOG | HE1001 | CONNECTION INFORMATION COLLECTION | MATERIAL COLLECTION KNOWLEDGE DATABASE | CAUSE IDENTIFICATION POSSIBLE |
| | | | | | CONNECTION NUMBER UPPER LIMIT REACHED, COMMUNICATION IMPOSSIBLE | CAUSE IDENTIFICATION KNOWLEDGE DATABASE | CAUSE IDENTIFICATION POSSIBLE |
| 26 | MIDDLEWARE | 11 | CONNECTION INFORMATION | ME1255 | RESTART | RESPONSE DETERMINATION KNOWLEDGE | CAUSE IDENTIFICATION POSSIBLE |
| | | | | | SHUTDOWN -r | RESPONSE METHOD KNOWLEDGE DATABASE | RESPONSE POSSIBLE |
| … | … | … | … | … | … | … | … |

FIG. 4

| RULE | EFFECT |
| --- | --- |
| SYMPTOM = HANG-UP | CONNECTION INFORMATION |
| ⋮ | ··· |

FIG. 5

| RULE | EFFECT |
| --- | --- |
| SYMPTOM = HANG-UP AND SEVERAL CONNECTIONS IN CONNECTION INFORMATION = FIN_WAIT_2 CONDITION | CONNECTION NUMBER UPPER LIMIT REACHED, COMMUNICATION IMPOSSIBLE |
| ⋮ | … |

FIG. 6

| RULE | EFFECT |
| --- | --- |
| SYMPTOM = HANG-UP AND OPERATING CONDITION = ACTUAL OPERATION | RESTART |
| SYMPTOM = HANG-UP AND OPERATING CONDITION = DEVELOPMENT MACHINE | ADJUSTMENT OF APPLICATION SERVER TIMEOUT VALUE |
| ⋮ | … |

FIG. 7

| RULE | EFFECT |
|---|---|
| RESTART | SHUTDOWN -r |
| ADJUSTMENT OF APPLICATION SERVER TIMEOUT VALUE | CORRECT VALUE OF SETTING FILE TIMEOUT TAG, AND RESTART APPLICATION SERVER |
| ⋮ | ... |

FIG. 9

| RESPONSE SUBJECT FAILURE |
|---|
| INTER-PROCESS COMMUNICATION ERROR |
| ADDITIONAL HARD DISC ERROR |
| ⋮ |

FIG. 10

| NON-RESPONSE SUBJECT CAUSE | RESPONSE METHOD |
|---|---|
| CUSTOMER DEVELOPMENT APPLICATION BUG | ASK CUSTOMER TO INVESTIGATE |
| CUSTOMER ADDITIONAL USB INSTRUMENT | USB INSTRUMENT REMOVAL |
| ⋮ | … |

FAILURE RESPONSE SUPPORT APPARATUS AND FAILURE RESPONSE SUPPORT METHOD

CROSS-REFERENCE TO RELATED APPLICATIONS

This application is based upon and claims the benefit of priority from prior Japanese Patent Application No. 2008-6037 filed on Jan. 15, 2008, the entire contents of which are incorporated herein by reference.

BACKGROUND

1. Field

The present invention relates to a failure response support apparatus and failure response support method for responding to failure of a management subject apparatus, based on incident information.

2. Description of the Related Art

In recent years, failures occurring in a computer system, including hardware, software and a network communication function, are increasing. This is because configurations of the hardware and software of computer systems are becoming more complex.

In the event of such a failure, error information output by the computer system is reported to a system support personnel side. The system support personnel side which accepts the report generates incident information (opens an incident) with the received error information as a base. The incident information includes all information relating to the failure, from the failure occurring to a failure response.

The system support personnel side instructs maintenance operation personnel dispatched to a computer system side to collect information (various kinds of log, system setting information, processing conditions and the like, which information will hereafter be called "material") necessary to identify a cause of the failure, and send it to the system support personnel side.

Then, the system support personnel side manually analyzes the received material, and carries out an identification of the cause and a determination of a response method. In the event that the received material is insufficient for identification of the cause and determination of the response, the system support personnel side instructs the maintenance operation personnel to further collect other material, and send it to the system support personnel side.

That is, the further collection and sending of material by the maintenance operation personnel, and the analysis of the received material by the system support personnel side, are repeated until the cause of the failure can be identified and the response method decided on. When the cause of the failure is finally identified and the response method decided on, the cause and response method are added to the incident information, and the incident information is closed. Then, the response method is presented to the maintenance operation personnel, and the maintenance operation personnel, based on the presentation, carry out a specific failure response.

As heretofore described, as a procedure of the failure response is cumbersome, an authoring tool has been proposed for a Bayesian Network troubleshooter which, in the event of a failure occurring in a computer system, supports a failure cause identification by transposing answers to questions given to a user of the computer system into a predetermined data structure, as disclosed in, for example, JP-A-2001-117776.

Also, as disclosed in, for example, JP-A-2005-316998, in the event of a failure occurring in a computer system, failure information is converted into a structured response object. The structured response object includes a term and/or phrase linked to a description of a problem relating to the computer system. Based on the term and/or phrase linked to the description of the problem, diagnosis data corresponding to the failure information converted into the structured response object is provided to the user. The user carries out a failure response in accordance with the diagnosis data.

SUMMARY

According to an aspect of the present invention, there is provided a recording medium on which is stored a failure response support program which causes a computer apparatus to execute a failure response support process based on incident information related to a failure of a management subject apparatus. The program causes the computer to execute: a failure response step management procedure which correlates steps of the response to the failure with the incident information, and a response knowledge acquisition procedure which refers to failure response method information describing response knowledge corresponding to each step of the response to the failure, and acquires response knowledge for addressing the failure in accordance with the response to the failure developed by the failure response step management procedure. A response knowledge process execution procedure executes a process in accordance with the response knowledge for the failure acquired by the response knowledge acquisition procedure.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 2 is a functional block diagram showing a configuration of a failure response support apparatus according to the embodiment;

FIG. 3 is a diagram showing one example of incident information;

FIG. 4 is a diagram showing one example of data of a symptom database material collection knowledge database;

FIG. 5 is a diagram showing one example of data of a symptom database cause identification knowledge database;

FIG. 6 is a diagram showing one example of data of a symptom database response determination knowledge database;

FIG. 7 is a diagram showing one example of data of a symptom database response method knowledge database;

FIG. 9 is a diagram showing one example of data of a response subject failure list database;

FIG. 10 is a diagram showing one example of data of a non-response subject failure response method list database;

DETAILED DESCRIPTION OF THE PREFERRED EMBODIMENT(S)

The known technology represented by the heretofore described JP-A-2001-117776 serves only to provide management with the questions posed to the user of the computer system by the maintenance operation personnel in order to decide on the response method, and answers thereto. However, the maintenance operation personnel might pose a question unrelated to the cause of the failure, or the user of the computer system might give an answer unrelated to the cause of the failure in response to a question. Thus, it is difficult to identify the cause of the failure and determine the response.

Also, with the known technology represented by JP-A-2005-316998, the diagnosis data are only provided to the user if diagnosis data corresponding to the failure information converted into the structured response object exists, that is, in the event that the failure is an already known failure for which a response method has been established. For this reason, it is impossible to provide a response method for an unknown failure.

Then, even if the heretofore described technologies were combined, for an unknown failure, it would be impossible to effectively carry out the identification of the cause of the failure and determination of the response.

The present inventor has invented a failure response support apparatus and failure support method which, for a failure occurring in a computer system, effectively identifies a cause of the failure and determines a response method, and provides an appropriate specific response method to a user of the computer system or to maintenance operation personnel.

Hereafter, a detailed description will be given of an embodiment, referring to the attached drawings. Failure response subjects broadly encompass apparatus which can output incident information, such as a server apparatus, or a communication apparatus.

Figure 1:
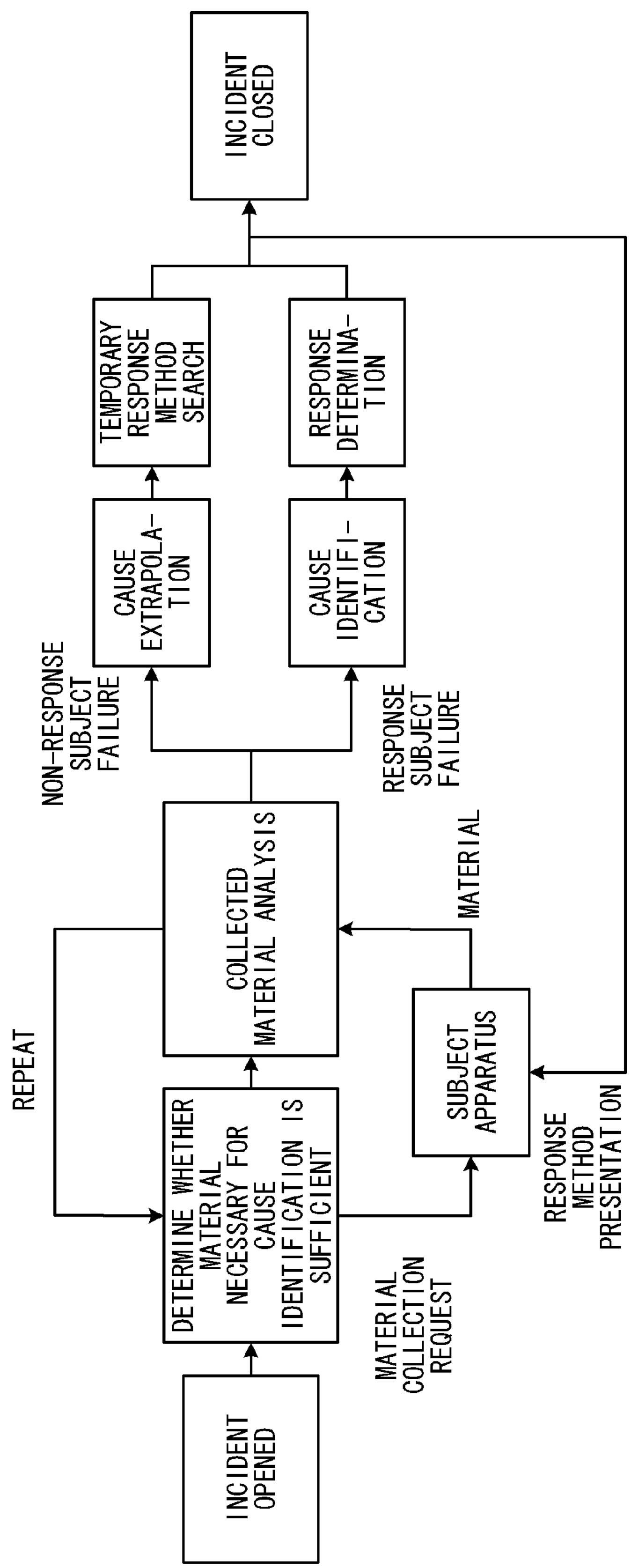
FIG. 1 is a diagram showing an outline of an embodiment.

First, a description will be given of an outline of the embodiment. FIG. 1 is a diagram showing the outline of the embodiment. As shown in the diagram, first, on a failure occurring in a failure response subject apparatus, the subject apparatus notifies the failure response apparatus of an incident. The incident notification includes at least a symptom of the failure, an operation at a time of the failure occurring, a reproducibility or a frequency of the symptom, a subject apparatus hardware configuration, and a subject apparatus software configuration, but this is insufficient for identifying a cause of the failure and deciding on a response method.

The failure response apparatus, on receipt of notification of the incident, generates incident information on the incident (incident opened). Then, it determines whether or not there is sufficient material to identify the cause of the failure. Immediately after the incident has been opened, absolutely no material necessary for identifying the cause of the failure has been collected. Therein, the failure response apparatus, based on the symptom of the failure and so on, refers to material collection knowledge in which the failure symptom and material which should be collected in order to identify the cause of the failure are correlated, and identifies the material necessary for identifying the cause of the failure. Then, the failure response apparatus requests a collection of the identified material from a subject apparatus side.

The subject apparatus side automatically, semi-automatically or manually collects the requested material. Then, the subject apparatus side transmits or sends the collected material to a failure response apparatus side via a communication or a recording medium.

The failure response apparatus which receives the material collected on the subject apparatus side analyzes the material. The failure response apparatus, based on an analysis result, determines whether or not there is sufficient material necessary for identifying the cause and, in the event of determining that it is insufficient, the failure response apparatus, based on the symptom of the failure and on the previously collected material, refers to the material collection knowledge, and identifies further material necessary for identifying the cause of the failure. Then, the failure response apparatus requests a further collection of the identified material of the subject apparatus side.

The subject apparatus side automatically, semi-automatically or manually collects the further requested material. Then, the subject apparatus side transmits or sends the collected material to the failure response apparatus side via a communication or a recording medium.

The heretofore described material collection, analysis of the collected material, determination of whether or not there is sufficient material necessary for identifying the cause, and further material collection, are repeated until it is determined that there is sufficient material necessary for identifying the cause.

On it being determined that there is sufficient material necessary for identifying the cause, it is determined whether or not the failure is a response subject failure. In the event that the failure is not a known response subject failure (it is a non-response subject failure), the failure response apparatus, based on the symptom of the failure and on the collected material, carries out a cause extrapolation, and searches for a temporary response method. Then, the failure response apparatus presents the temporary response method to the subject apparatus side, and closes the incident.

Meanwhile, if the failure is a response subject failure (it is a response subject failure), the failure response apparatus, based on the symptom of the failure and on the collected material, refers to cause identification knowledge in which the cause of the failure is correlated to the failure symptom and collected material, carries out a cause identification and, referring to response determination knowledge, decides on a response method. Then, the failure response apparatus acquires a specific response method corresponding to the method decided on, presents it to the subject apparatus side, and closes the incident.

According to the above, the failure response apparatus stratifies steps of the failure response for the failure occurring in the subject apparatus into four steps, which are a material collection step, a cause identification step, a response determination step, and a response method acquisition step, shifting to a subsequent step after acquiring sufficient response knowledge acquirable at each step. As it becomes easier to slice up a failure response bottleneck, it is possible to promptly and effectively deal with a previously unknown failure too.

As heretofore described, the failure response apparatus repeats the material collection until material sufficient to enable the cause identification is collected, and carries out a cause identification, a response method determination, a response method presentation, and an incident closing, after it is determined that sufficient material has been collected. Consequently, by preventing a regression wherein the failure is not dealt with due to wrongly identifying a cause, and carrying out a response to the wrong cause, as a result of carrying out a cause identification with insufficient material, and having to redo the material collection from the beginning, it is possible to achieve a failure solution promptly and effectively.

Next, a description will be given of a configuration of a failure response support apparatus according to the embodiment. FIG. 2 is a functional block diagram showing the configuration of the failure response support apparatus according to the embodiment. As shown in the diagram, the failure response support apparatus 100 according to the embodiment, and a failure response subject apparatus 200 and input-output device 300 of a terminal apparatus or the like, are communicably connected to each other. Furthermore, the failure response subject apparatus 200, and the input-output device 300, which carries out an operation of the failure response subject apparatus 200, are communicably connected to each other. Also, an input device 300*a*, such as a keyboard or a mouse, for carrying out an operational input of the operation of the failure response subject apparatus 200, and a display device 300*b*, such as a display, are connected to the input-output device 300.

Although, in FIG. 2, an example is shown in which only one failure response subject apparatus 200 is connected to the failure response support apparatus 100, it is also acceptable to have a plurality of failure response subject apparatus 200 communicably connected to the failure response support apparatus 100 via a network.

The failure response support apparatus 100 includes a controller 101, a memory 102, and an input-output interface 103, which is an interface for communication with the failure response subject apparatus 200 and the input-output device 300. The controller 101, being a control process device such as a microcomputer, further includes an incident reception process unit 101*a*, an incident information management unit 101*b*, a material acceptance process unit 101*c*, a symptom DB (database) search process unit 101*d*, a response method output process unit 101*e*, and a response subject failure determination process unit 101*f*.

The incident reception process unit 101*a* is a process unit which receives a notification of an incident from the failure response subject apparatus 200. The incident information management unit 101*b*, based on the received incident notification, generates incident information in an incident database 102*a*, to be described hereafter.

When generating the incident information, the incident information management unit 101*b* adds information on a person in charge of the failure response subject apparatus 200, and unique incident identification, as well as symptoms of the failure, a category of the symptoms, an operation at a time of the failure occurring, a reproducibility or a frequency of the symptoms, a subject apparatus hardware configuration, and a subject apparatus software configuration, all included in the incident notification, to the incident information, and sets a status (condition) of the incident at "open".

Also, every time material collected in the failure response subject apparatus 200 is accepted by the material acceptance process unit 101*c*, the incident information management unit 101*b* adds information relating to the material to corresponding incident information. Furthermore, every time a search result of a symptom database 102*b*, to be described hereafter, is acquired by the symptom database search process unit 101*d*, the incident information management unit 101*b* adds the search result to corresponding incident information.

The material acceptance process unit 101*c* accepts material collected in the failure response subject apparatus 200, based on a search result of a material collection knowledge database search process unit 101*d*-1, to be described hereafter, of the symptom database search process unit 101*d*. Information relating to the accepted material is added to corresponding incident information by the incident information management unit 101*b*.

The material acceptance process unit 101*c*, as well as receiving material via a communication from the failure response subject apparatus 200, can also accept an input of material sent via a recording medium.

The symptom database search process unit 101*d* is a process unit which searches the symptom database 102*b*, to be described hereafter, with information included in the incident information as a key, and acquires corresponding appropriate response knowledge. The symptom database search process unit 101*d*, specifically, includes the material collection knowledge database search process unit 101*d*-1, a cause identification knowledge database search process unit 101*d*-2, a response determination knowledge database search process unit 101*d*-3, and a response method knowledge database search process unit 101*d*-4.

The material collection knowledge database search process unit 101*d*-1 searches a material collection knowledge database 102*b*-1, to be described hereafter, with information relating to failure symptoms, or failure symptoms and already acquired material, included in the incident information as a key, and acquires distinguishing information on material to be collected.

The material collection knowledge database search process unit 101*d*-1 transmits the acquired distinguishing information on material to be collected to the failure response subject apparatus 200, and requests a collection of the material. The failure response subject apparatus 200 collects the material that has been requested, and transmits or sends it to the failure response support apparatus 100. A material acceptance process unit 101*c* of the failure response support apparatus 100 accepts the material transmitted or sent, and adds information relating to the material to corresponding incident information.

The cause identification knowledge database search process unit 101*d*-2 is a process unit which searches a cause identification knowledge database 102*b*-2, to be described hereafter, with information relating to failure symptoms and the relevant material in the incident information, to which has been added the information relating to the material acquired by the material collection knowledge database search process unit 101*d*-1, as a key, and identifies a cause corresponding to the failure depending on a search result.

Herein, in the event that the cause identification knowledge database search process unit 101*d*-2 is unable to identify the cause corresponding to the failure, the material collection knowledge database search process unit 101*d*-1, with the information relating to the failure symptoms, or the failure symptoms and the already acquired material, included in the incident information as the key, searches to see whether or not there is further material to collect. In the event that there is further material to collect, the material collection knowledge database search process unit 101*d*-1 carries out the heretofore described process with regard to a material collection. In the event that there is no further material to collect, the material collection knowledge database search process unit 101*d*-1 causes that fact to be displayed on the display device 300*b* of the input-output device 300.

The response determination knowledge database search process unit 101*d*-3 is a process unit which, in the event that the cause identification knowledge database search process unit 101*d*-2 is able to identify the cause corresponding to the failure, searches a response determination knowledge database 102*b*-3, to be described hereafter, with the cause as a key, and decides on a response to the failure. Herein, in the event that a response to the identified cause cannot be decided on, the response determination knowledge database search process unit 101*d*-3 causes that fact to be displayed on the display device 300*b* of the input-output device 300.

The response method knowledge database search process unit 101*d*-4 is a process unit which, in the event that the response determination knowledge database search process unit 101*d*-3 is able to decide on a response to the failure, searches a response method knowledge database 102*b*-4, to be described hereafter, with the response as a key, and acquires a specific response method for the failure. If a specific response method for the response decided on cannot be acquired, the response method knowledge database search process unit 101*d*-4 causes that fact to be displayed on the display device 300*b* of the input-output device 300.

The response method output process unit 101*e* is a process unit which notifies the failure response subject apparatus 200 side of the specific response method for the failure acquired by the response method knowledge database search process unit 101*d*-4. Specifically, the response method output process unit 101*e* causes the specific response method for the failure acquired by the response method knowledge database search process unit 101*d*-4 to be displayed on the display device 300*b* of the input-output device 300.

The response subject failure determination process unit 101*f*, prior to the process of the cause identification knowledge database search process unit 101*d*-2, carries out a determination of whether or not the failure response subject apparatus 200 is a failure cause identification subject apparatus, by referring to a response subject failure list database 102*c*, to be described hereafter.

If the failure response subject apparatus 200 is a failure cause identification subject apparatus, the response subject failure determination process unit 101*f* shifts the process to the cause identification knowledge database search process unit 101*d*-2. Meanwhile, if it is determined that the failure response subject apparatus 200 is not a failure cause identification subject apparatus, the response subject failure determination process unit 101*f* refers to a non-response subject failure response method list database 102*d*, to be described hereafter, and acquires a temporary procedure for the failure response subject apparatus 200. The acquired temporary procedure is displayed on the display device 300*b* of the input-output device 300, via the response method output process unit 101*e*.

The memory 102 is a volatile or non-volatile storage device including a plurality of databases. The memory 102 includes the incident database 102*a*, the symptom database 102*b*, the response subject failure list database 102*c*, and the non-response subject failure response method list database 102*d*.

The incident database 102*a* is a database which stores incident information in, for example, the kind of data format shown in FIG. 3. Based on, for example, FIG. 3, the incident information has columns which are "Person in Charge", indicating a person in charge of carrying out a failure response on the failure response subject apparatus 200 side, "Incident Identification", for uniquely distinguishing incident information, "Symptom", of a failure exhibited in an incident, "Symptom Category", indicating a category of the symptom, "Status", indicating a condition of the incident information, and "Symptom Database Search Input-Output Information", in which is stored a result of searching the symptom database 102*b*.

The "Symptom Database Search Input-Output Information" column further has columns which are "Search Identification", for uniquely distinguishing a search process, "Layer" indicating a failure response subject apparatus 200 failure occurrence layer, "Material", in which is stored information relating to material collected from the failure response subject apparatus 200, "Symptom Database Search Result", "Selected Symptom Database", indicating which symptom database has been searched, and "Symptom Database Evaluation", in which a result of searching a symptom database is evaluated. Also, the "Material" column further has columns which are "Material Identification", uniquely distinguishing the material, "Material Name", and "Material Value", which is an item of data indicated by the material.

A record is added to the "Symptom Database Search Input-Output Information" column for every search of a symptom database. For example, every time collected material is accepted, information relating to the material is added. Then, the "Symptom Database Search Input-Output Information" column becomes not only a result of searching a symptom database, but also input information when next searching a symptom database. By so doing, as input information when searching a symptom database is increased every time a symptom database is searched, symptom database search conditions become more detailed, and search results become more appropriate, so it is possible to carry out a prompt and effective failure response.

The symptom database 102*b* is a database in which, in relation to a failure response, appropriate corresponding knowledge (an effect) is correlated with an input condition (a rule) and stored. The correlated rule and effect are called a symptom. The symptom database 102*b*, specifically, includes four databases, which are the material collection knowledge database 102*b*-1, the cause identification knowledge database 102*b*-2, the response determination knowledge database 102*b*-3, and the response method knowledge database 102*b*-4. Data schema of these four databases are all identical.

The material collection knowledge database 102*b*-1 takes information relating to a failure symptom and a category of the symptom, or to a failure symptom, a category of the symptom, and material already collected, as an input condition, and distinguishes information of material which should be collected next, correlated to the input condition. For example, as shown in FIG. 4, as one example of data of the material collection knowledge database 102*b*-1, "Symptom=hang-up" being stored as a "Rule", "Connection information" is correlated as an "Effect" corresponding to the "Rule". That is, material collection knowledge regarding what material should be collected for a certain symptom is stored, instructing a collection of "Connection information" as material in the case of "Symptom=hang-up". It may also happen that not only a symptom, but also information relating to already collected material is included in the "Rule".

The cause identification knowledge database 102*b*-2 takes information relating to a failure symptom and a category of the symptom, or to a failure symptom, a category of the symptom, and material already collected, or a material analysis result, as an input condition. A cause of the failure is stored correlated to the input condition. For example, as shown in FIG. 5, as one example of data of the cause identification knowledge database 102*b*-2, "Symptom=hang-up and several connections in connection information=FIN_WAIT_2 condition" being stored as a "Rule", "Connection number upper limit reached, communication impossible" is correlated as an "Effect" corresponding to the "Rule". That is, cause identification knowledge, regarding the cause of the failure in the case of "Symptom=hang-up and several connections in connection information=FIN_WAIT_2 condition", is stored.

The response determination knowledge database 102*b*-3 takes information relating to a failure symptom, a category of the symptom, and an operating condition, or to a failure symptom, a category of the symptom, and material already collected, or a material analysis result, an operating condition and the like, as an input condition. A response to the failure is stored correlated to the input condition. For example, as shown in FIG. 6, as one example of data of the response determination knowledge database 102*b*-3, "Symptom=hang-up and operating condition=actual operation" being stored as a "Rule", "Restart" is correlated as an "Effect" corresponding to the "Rule". That is, response determination knowledge, depending on what kind of response should be carried out in the case of "Symptom=hang-up and operating condition=actual operation", is stored.

The response method knowledge database 102*b*-4 is a database in which, taking a response decided on by the response determination knowledge database search process unit 101*d*-3 of the failure response support apparatus 100 as an input condition, a specific response method for the failure is stored correlated to the input condition. For example, as shown in FIG. 7, as one example of data of the response method knowledge database 102*b*-4, "Restart" being stored as a "Rule", "Shutdown−r" (this "Shutdown−r" is a command for carrying out a restart) is correlated as an "Effect" corresponding to the "Rule". That is, response method knowledge, indicating what kind of specific response should be carried out in the case of "Restart", is stored.

A data structure of the symptom database 102*b* is a hierarchical structure in which, between two consecutive databases of consecutive steps, in an order of the material collection step, the cause identification step, the response determination step, and the response method acquisition step, respective symptoms are correlated many-to-many.

Figure 8:
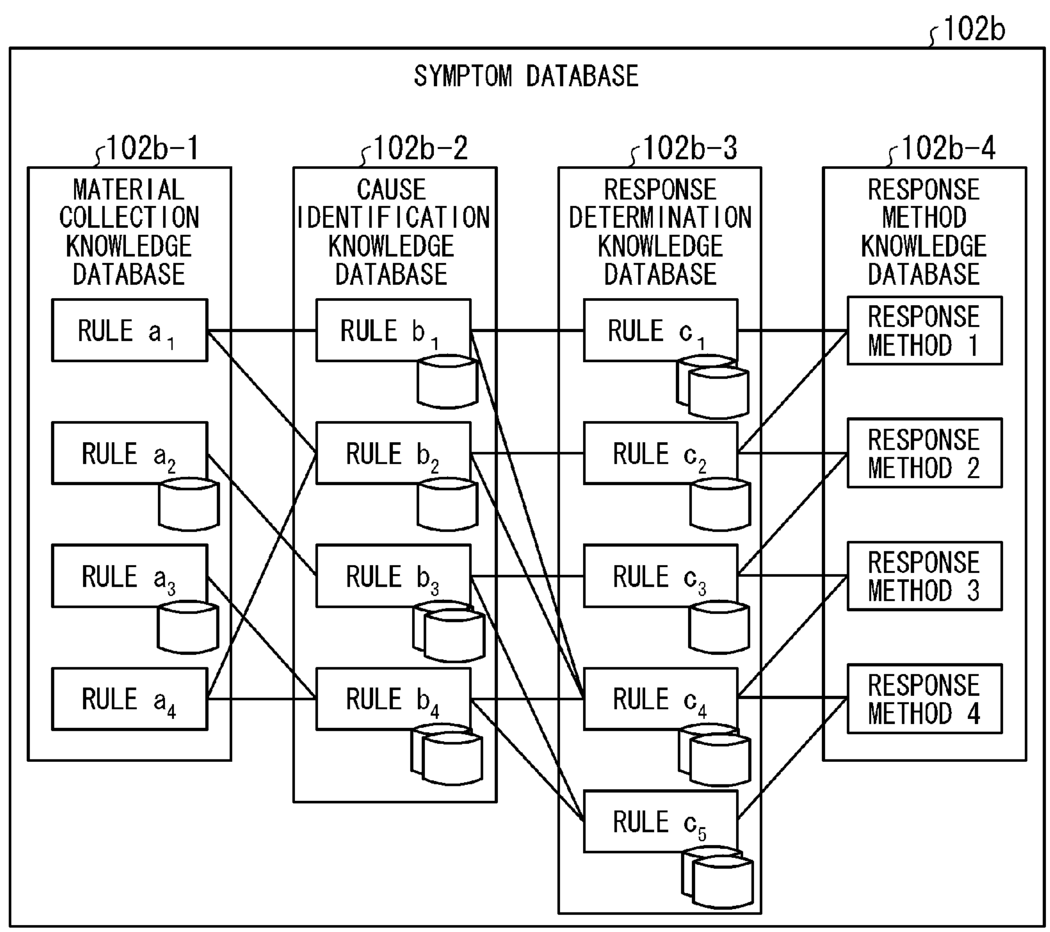
FIG. 8 is a diagram showing one example of a symptom database data structure.

For example, as shown in one example of a symptom database data structure in FIG. 8, on a rule a1 of the material collection knowledge database 102*b*-1, referred to in the material collection step, being taken as a "parent node", a rule b1 and a rule b2 of the cause identification knowledge database 102*b*-2 referred to in the cause identification step, which is the next step, are correlated as "child nodes".

Also, for example, rules of the material collection knowledge database 102*b*-1 referred to in the previous step, the material collection step, which takes the rule b2 of the cause identification knowledge database 102*b*-2 referred to in the cause identification step as a "child node", are the rule a1 and a rule a4.

Also, for example, rules of the response determination knowledge database 102*b*-3 referred to in the previous step, the response determination step, which takes a response method 1 of the response method knowledge database 102*b*-4 referred to in the response method acquisition step as a "child node", are a rule c1 and a rule c2.

In this way, by structuring by correlating symptoms of databases, referred to respectively in two consecutive steps, in a many-to-many relationship at each step, as symptoms of a cause identification and response determination are narrowed down, it is possible to carry out the cause identification and response determination promptly and effectively.

The response subject failure list database 102*c* is a database in which is stored a list of subject apparatus for which the failure response support apparatus 100 carries out a failure cause identification. For example, as shown in FIG. 9, one example of data of the response subject failure list database 102*c* is data in a table format listing details of a response subject failure.

The non-response subject failure response method list database 102*d* is a database in which is stored a temporary procedure method presented for a failure for which the failure response support apparatus 100 does not carry out a failure cause identification. For example, as shown in FIG. 10, one example of data of the non-response subject failure response method list database 102*d* is data in a table format in which a temporary procedure response method is correlated to a non-response subject cause.

Figure 11:
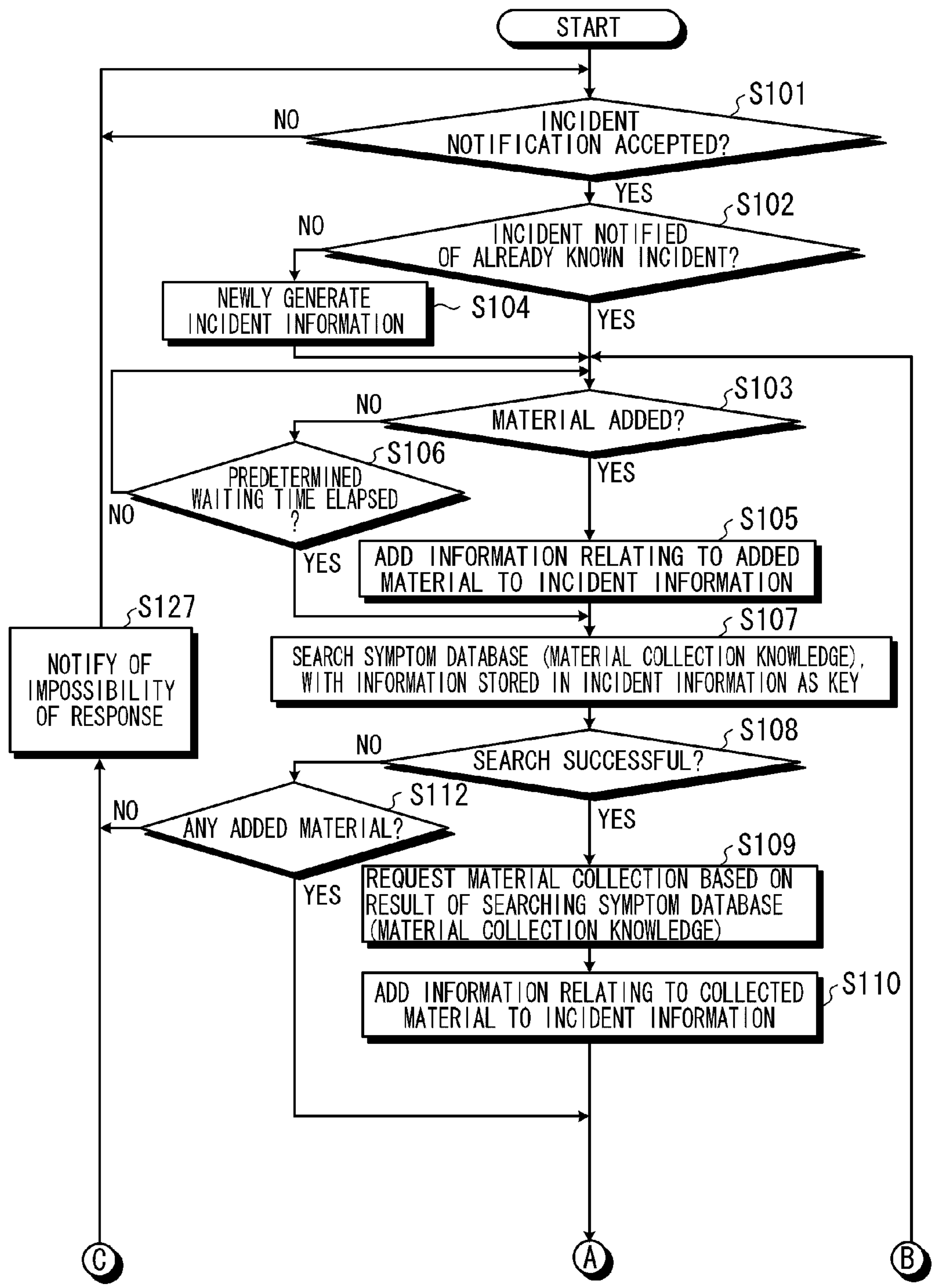
FIG. 11 is a flowchart (a first one) showing a failure response support process procedure according to the embodiment.
Figure 12:
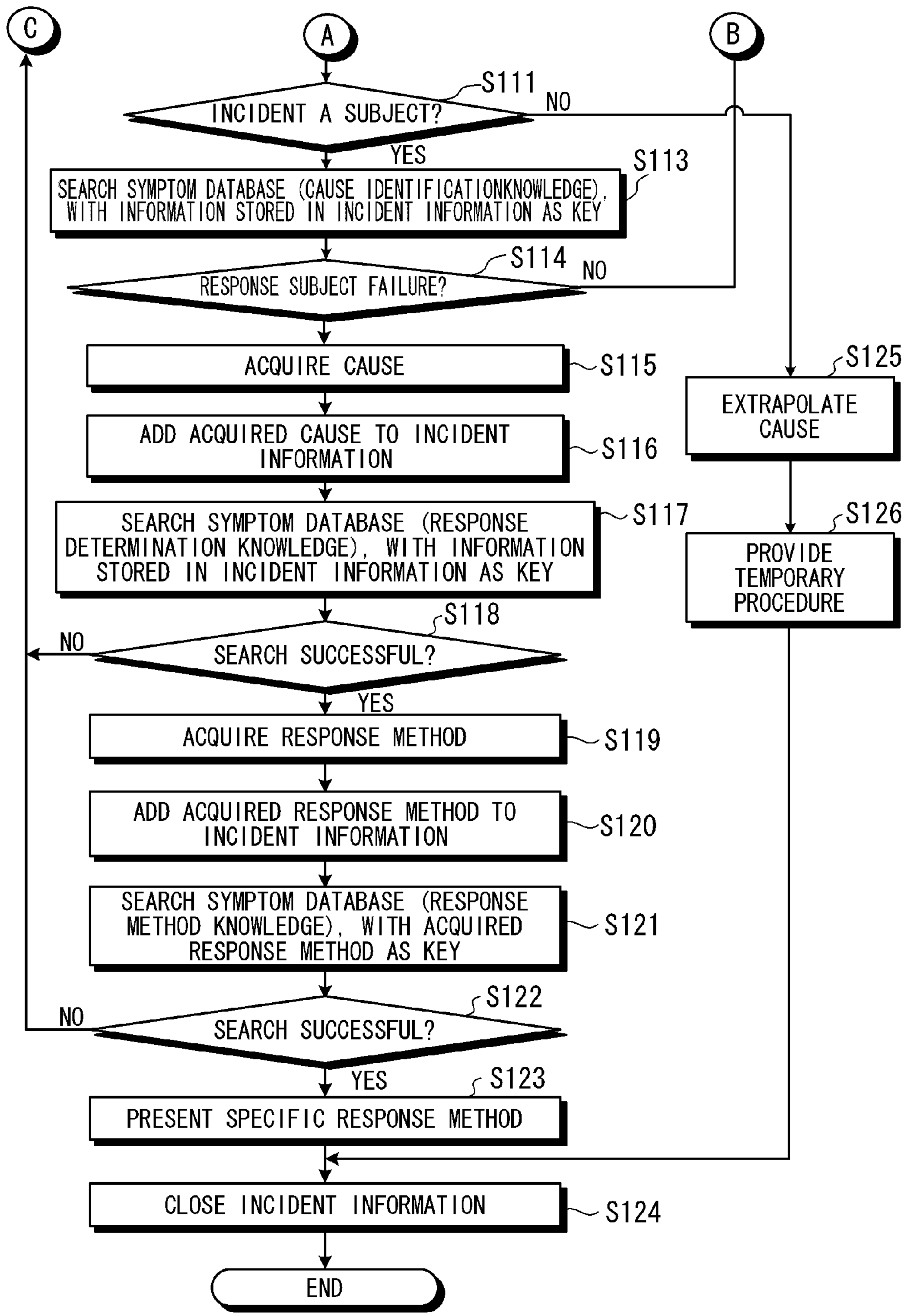
FIG. 12 is a flowchart (a second one) showing the failure response support process procedure according to the embodiment.

Next, a description will be given of a failure response support process executed by the failure response support apparatus 100. FIGS. 11 and 12 are flowcharts showing a failure response support process procedure according to the embodiment. First, FIG. 11 will be referred to. Firstly, the incident reception process unit 101*a* of the failure response support apparatus 100 determines whether or not it has accepted notification of an incident (step S101). If it is determined that it has accepted notification of an incident (step S101: Yes), the process shifts to step S102, while if it is not determined that it has accepted notification of an incident (step S101: No), the process repeats step S101.

In step S102, the incident information management unit 101*b*, referring to the incident database 102*a*, determines whether or not the incident notification accepted in step S101 is of an already existing incident. If it is determined that it is of an already existing incident (step S102: Yes), the process shifts to step S103, while if it is determined that it is not of an already existing incident (step S102: No), the process shifts to step S104.

In step S104, the incident information management unit 101*b* newly generates incident information, and registers it in the incident database 102*a*. On step S104 finishing, the process shifts to step S103.

In step S103, the material acceptance process unit 101*c* determines whether or not material has been added by a manual input. If it is determined that material has been added by a manual input (step S103: Yes), the process shifts to step S105, while if it is determined that material has not been added by a manual input (step S103: No), the process shifts to step S106.

In step S105, the incident information management unit 101*b* adds information relating to the newly added material to corresponding incident information. Meanwhile, in step S106, the material acceptance process unit 101*c* determines whether or not a predetermined waiting time has elapsed. If it is determined that the predetermined waiting time has elapsed (step S106: Yes), the process shifts to step S107, while if it is determined that the predetermined waiting time has not elapsed (step S106: No), the process shifts to step S103.

In step S107, the material collection knowledge database search process unit 101*d*-1, with information stored in the incident information as a key, searches the symptom database 102*b* (the material collection knowledge database 102*b*-1). Continuing on, the material collection knowledge database search process unit 101*d*-1 determines whether or not the search of step S107 has been successful (step S108). If it is determined that the search of step S107 has been successful (step S108: Yes), the process shifts to step S109, while if it is determined that the search of step S107 has not been successful (step S108: No), the process shifts to step S112.

In step S109, the material collection knowledge database search process unit 101*d*-1, based on a result of searching the symptom database 102*b* (the material collection knowledge database 102*b*-1), requests a collection of material of the failure response subject apparatus 200. Continuing on, the material acceptance process unit 101*c* receives incident information collected by and transmitted from the failure response subject apparatus 200, and the incident information management unit 101*b* adds information relating to the collected material to corresponding incident information (step S110).

Continuing on, referring to FIG. 12, the response subject failure determination process unit 101*f* determines whether or not the failure of the apparatus which has transmitted the incident notification is a failure which is a subject of the failure response support apparatus 100 carrying out a failure cause identification (step S111). That is, the response subject failure determination process unit 101*f* determines whether or not details of the failure of the apparatus which has transmitted the incident notification are registered in the response subject failure list database 102*c*.

If it is determined that the failure of the apparatus which has transmitted the incident notification is a failure for which the failure response support apparatus 100 is responsible for carrying out a failure cause identification (an area of responsibility failure) (step S111: Yes), the process shifts to step S113, while if it is determined that the failure of the apparatus which has transmitted the incident notification is not a failure for which the failure response support apparatus 100 is responsible for carrying out a failure cause identification (step S111: No), the process shifts to step S125.

Meanwhile, in step S112 of FIG. 11, the incident information management unit 101*b* determines whether or not any material was added in step S105. If it is determined that material was added in step S105 (step S112: Yes), the process shifts to step S111, while if it is determined that material was not added in step S105 (step S112: No), the process shifts to step S127 of FIG. 11.

In step S113, the cause identification knowledge database search process unit 101*d*-2, with information stored in the incident information as a key, searches the symptom database 102*b* (the cause identification knowledge database 102*b*-2). Continuing on, the cause identification knowledge database search process unit 101*d*-2 determines whether or not the search of step S113 has been successful (step S114).

If it is determined that the search of step S113 has been successful (step S114: Yes), the process shifts to step S115, while if it is determined that the search of step S113 has not been successful (step S114: No), the process shifts to step S103.

In step S115, the cause identification knowledge database search process unit 101*d*-2 acquires the failure cause found in the search of step S113. Continuing on, the incident information management unit 101*b* adds the acquired failure cause to corresponding incident information (step S116).

Continuing on, the response determination knowledge database search process unit 101*d*-3, with information stored in the incident information as a key, searches the symptom database 102*b* (the response determination knowledge database 102*b*-3). Continuing on, the response determination knowledge database search process unit 101*d*-3 determines whether or not the search of step S117 has been successful (step S118).

If it is determined that the search of step S117 has been successful (step S118: Yes), the process shifts to step S119, while if it is determined that the search of step S117 has not been successful (step S118: No), the process shifts to step S127 of FIG. 11.

Continuing on, in step S119, the response determination knowledge database search process unit 101*d*-3 acquires the response method found in the search of step S117. Continuing on, the incident information management unit 101*b* adds the acquired response method to corresponding incident information (step S120).

Continuing on, the response method knowledge database search process unit 101*d*-4, with information stored in the incident information as a key, searches the symptom database 102*b* (the response method knowledge database 102*b*-4). Continuing on, the response method knowledge database search process unit 101*d*-4 determines whether or not the search of step S121 has been successful (step S122).

If it is determined that the search of step S121 has been successful (step S122: Yes), the process shifts to step S123, while if it is determined that the search of step S121 has not been successful (step S122: No), the process shifts to step S127 of FIG. 11.

In step S123, the response method output process unit 101*e* causes the specific response method found in the search of step S121 to be displayed on the display device 300*b* of the input-output device 300. Continuing on, the incident information management unit 101*b* closes the incident information (step S124).

Meanwhile, in step S125, as the failure of the apparatus which has transmitted the incident notification is not a failure for which the failure response support apparatus 100 is responsible for carrying out a failure cause identification (a non-area of responsibility failure), a cause extrapolation is carried out, and the process shifts to step S126. The cause extrapolation is such that, for example, in the event that the failure is an inter-process communication error, the cause is in a customer development application.

In step S126, the response subject failure determination process unit 101*f*, searching the response subject failure list database 102*c* with the cause extrapolated in step S125 as a key, acquires a temporary procedure method for the non-area of responsibility apparatus, and the response method output process unit 101*e* causes the temporary procedure method to be displayed on the display device 300*b* of the input-output device 300. On the process finishing, the process shifts to step S124.

In step S127 of FIG. 11, the material collection knowledge database search process unit 101*d*-1, the response determination knowledge database search process unit 101*d*-3, or the response method knowledge database search process unit 101*d*-4 notifies the failure response subject apparatus 200 of an impossibility of responding. On the process finishing, the process shifts to step S101 of FIG. 11.

Figure 13A:
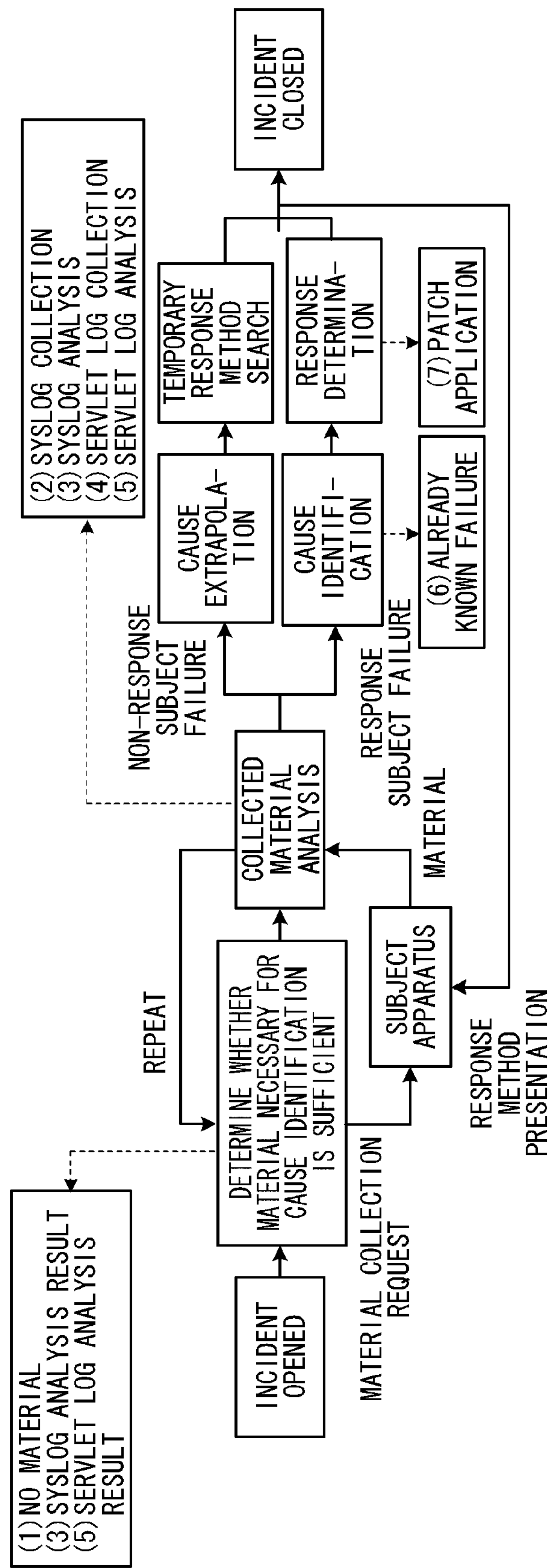
FIGS. 13A and 13B are diagrams showing an example (a first one) of an operation of the failure response support apparatus according to the embodiment.
Figure 13B:
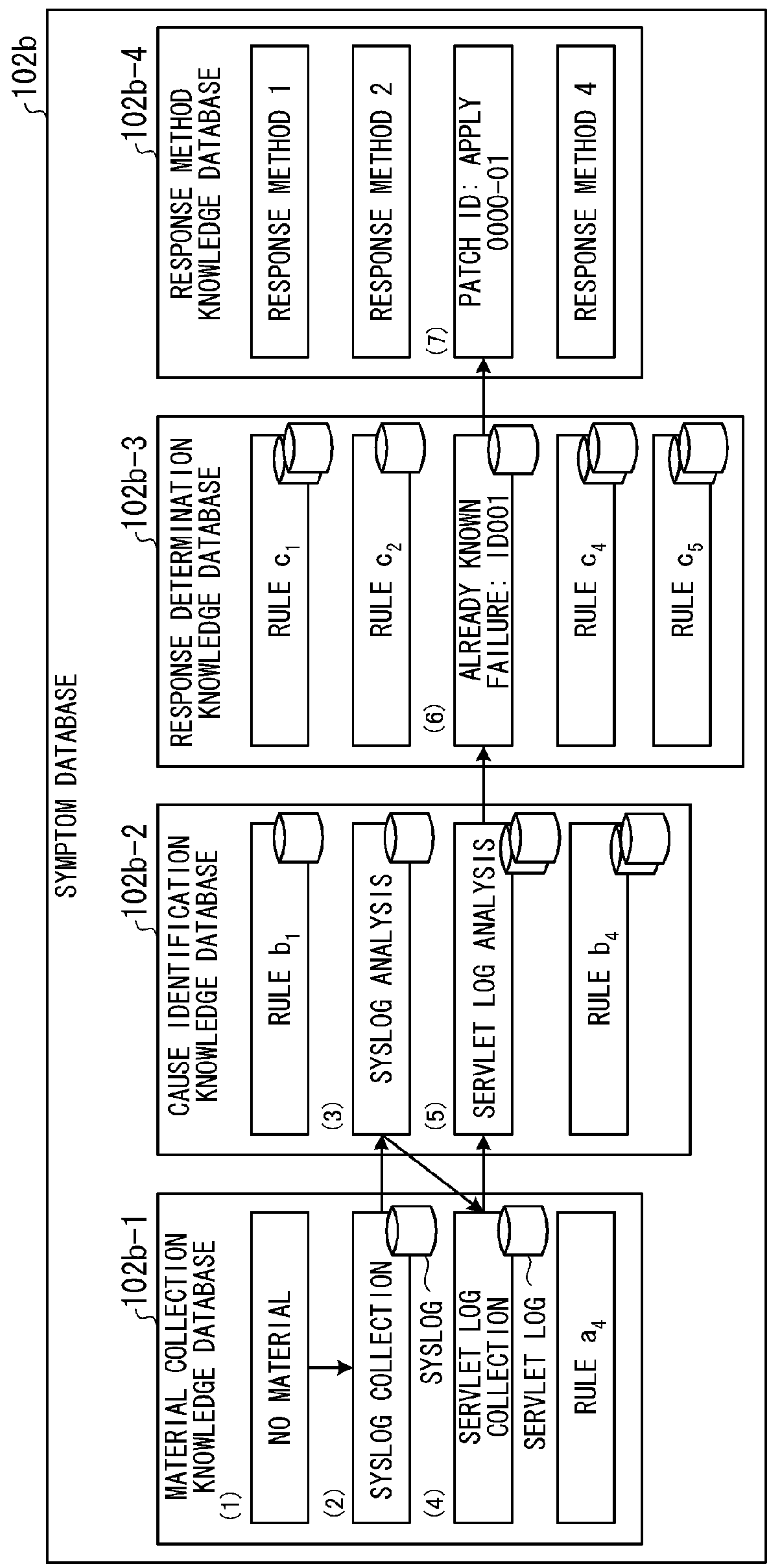

A description will be given, referring to FIGS. 13A, 13B, 14A and 14B, of an operational example of the heretofore shown failure response support apparatus according to the embodiment. FIGS. 13A and 13B are diagrams showing an example (a first one) of an operation of the failure response support apparatus 100 according to the embodiment. As shown in the diagrams, the operation starts from a “1. No material” condition. Based on information on a failure symptom, and the like, in incident information from the failure response subject apparatus 200 (the subject apparatus), the failure response support apparatus 100 searches the material collection knowledge database 102*b*-1 and, by “2. Collection of syslog (system log)” being acquired as material collection knowledge, a syslog of the subject apparatus is collected.

Then, after “3. Syslog analysis” is carried out, the failure response support apparatus 100, with the failure symptom and a syslog analysis result as a key, searches the cause identification knowledge database 102*b*-2. However, as the cause cannot be identified by this search, the failure response support apparatus 100, with the failure symptom and the syslog analysis result as a key, searches the material collection knowledge database 102*b*-1 again. By "4. Collection of servlet log" being acquired as material collection knowledge as a result of the search, a servlet log of the subject apparatus is collected.

Continuing on, after "5. Servlet log analysis" is carried out, the failure response support apparatus 100, with the failure symptom, the syslog analysis result, and a servlet log analysis result as a key, searches the cause identification knowledge database 102*b*-2. Then, as the cause can be identified by a result of this search as "6. Already known failure: ID001", the failure response support apparatus 100, with the cause as a key, searches the response determination knowledge database 102*b*-3.

Based on a result of searching the response determination knowledge database 102*b*-3, a response corresponding to "6. Already known failure: ID001" is decided on. Then, on the failure response support apparatus 100 searching the response method database 102*b*-4, with the response decided on as a key, response method knowledge, which is "7.Patch ID: apply 0000-01", is acquired. The response method knowledge "7.Patch ID: apply 0000-01" is ultimately reported to the subject apparatus.

Figure 14A:
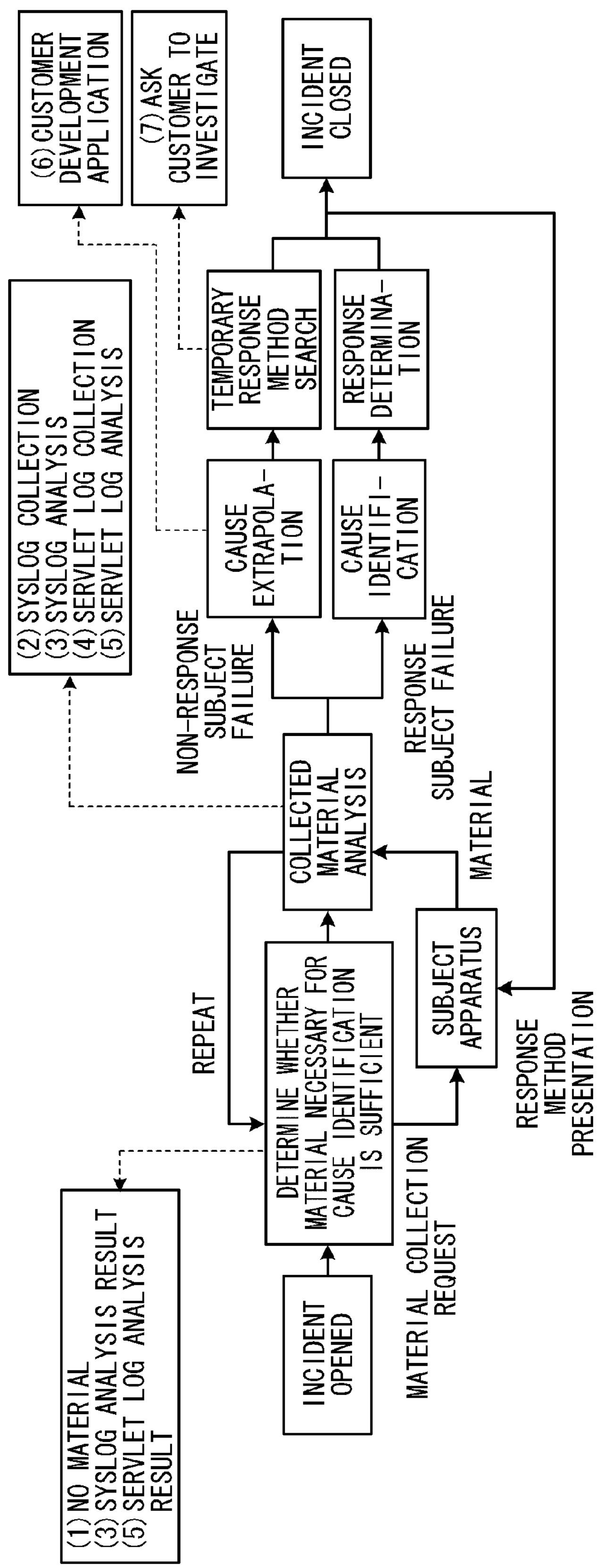
FIGS. 14A and 14B are diagrams showing an example (a second one) of an operation of the failure response support apparatus according to the embodiment.
Figure 14B:
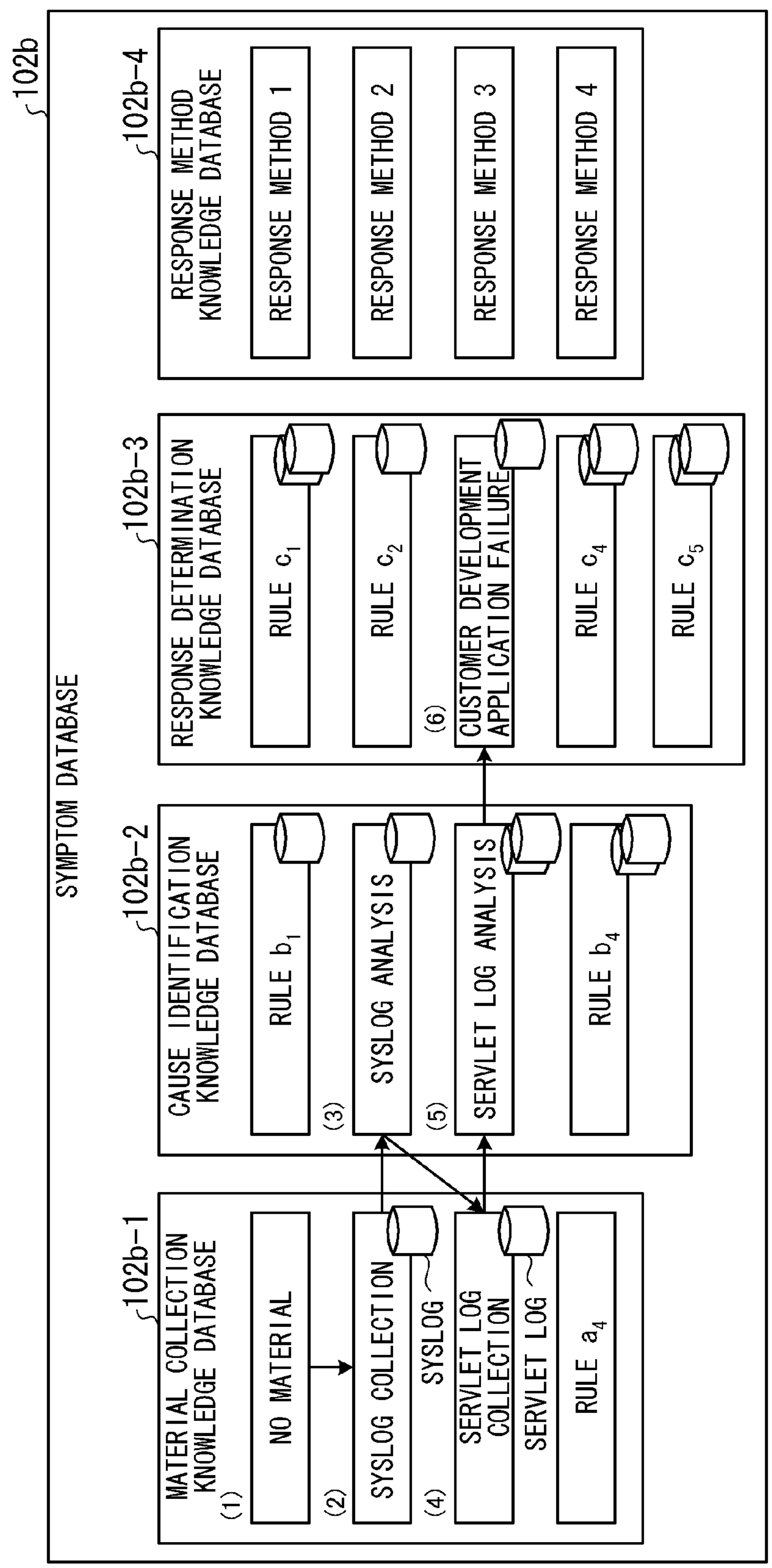

FIGS. 14A and 14B are diagrams showing an example (a second one) of an operation of the failure response support apparatus 100 according to the embodiment. As shown in the diagrams, the operation starts from a "1. No material" condition. Based on information on a failure symptom, and the like, in incident information from the failure response subject apparatus 200 (the subject apparatus), the failure response support apparatus 100 searches the material collection knowledge database 102*b*-1 and, by "2. Collection of syslog" being acquired as material collection knowledge, and a syslog of the subject apparatus is collected.

Then, after "3. Syslog analysis" is carried out, the failure response support apparatus 100, with the failure symptom and a syslog analysis result as a key, searches the cause identification knowledge database 102*b*-2. However, as the cause cannot be identified by this search, the failure response support apparatus 100, with the failure symptom and the syslog analysis result as a key, searches the material collection knowledge database 102*b*-1 again. By "4. Collection of servlet log" being acquired as material collection knowledge as a result of the search, a servlet log of the subject apparatus is collected.

Continuing on, after "5. Servlet log analysis" is carried out, the failure response support apparatus 100, with the failure symptom, the syslog analysis result, and a servlet log analysis result as a key, searches the cause identification knowledge database 102*b*-2. However, as the cause cannot be identified by a result of this search, it is extrapolated by a cause extrapolation as "6. Failure of customer development application". As the cause is not a failure cause already known to the failure response support apparatus 100, "7. Request investigation of customer" is carried out.

According to the heretofore described embodiment, as response knowledge appropriate for a failure is acquired in accordance with a response to the failure, and a process according to the response knowledge is executed, an advantage is obtained in that it is possible, without carrying out a wasteful response, to effectively carry out a response to the failure.

The steps of the response to the failure include, as the response knowledge, at least the material collection step to which material collection knowledge corresponds, the cause identification step to which cause identification knowledge corresponds, the response determination step to which response determination knowledge corresponds, and the response method acquisition step to which response method knowledge corresponds. As a shift is made to the next step of the response to the failure on the response knowledge appropriate for the failure being acquired in accordance with each step of the response to the failure, an advantage is obtained in that it is possible to reliably acquire the response knowledge at each step of the response to the failure, to eliminate a regression in the steps of the response to the failure and, without carrying out a wasteful response, to effectively carry out the response to the failure.

Also, according to the embodiment, a process result based on the response knowledge appropriate for the failure acquired at each step of the response to the failure is added to the incident information, failure response method information is referred to based on the incident information at each step of the response to the failure, and response knowledge appropriate for the failure is acquired. Consequently, an advantage is obtained in that it is possible to narrow down and effectively identify the cause of the failure in accordance with a process result based on response knowledge at a previous step of the response to the failure.

Also, according to the embodiment, at the response method acquisition step, the response method knowledge is presented to an operator who carries out the failure response as a process according to the acquired response method knowledge. Consequently, an advantage is obtained in that the operator can carry out the failure response using an accurate response method. Also, as the incident information is closed after the response method knowledge is presented to the operator who carries out the failure response, an advantage is obtained in that it is possible to discern that the failure has been remedied.

Also, according to the embodiment, in the event that the cause of the failure is not identified by the failure cause identification procedure, the material collection procedure is executed. Consequently, an advantage is obtained in that it is possible, collecting sufficient material to identify the cause of the failure, to more accurately identify the cause of the failure based on the sufficient material.

Also, according to the embodiment, in the event that it is determined that a failure of a management subject apparatus is not a failure for which the cause should be identified, stopping at only extrapolating the cause of the failure based on material, a cause identification is not carried out. Consequently, an advantage is obtained in that it is possible to eliminate a waste of attempting to identify a cause of a failure for which it is not necessary to carry out a cause identification.

Heretofore, a description has been given of the embodiment of the invention, but it is also acceptable that the invention, not being limited to this, be further implemented in various differing embodiments within a scope of a technological idea described in the patent claims. Also, the advantages described in the embodiment are not limiting.

In the heretofore described embodiment, the symptom database 102*b* is shown in a format functionally divided into four databases (the material collection knowledge database 102*b*-1, the cause identification knowledge database 102*b*-2, the response determination knowledge database 102*b*-3, and the response method knowledge database 102*b*-4) but, not being limited to this, it is also acceptable if they are integrated into one symptom database. Also, the symptom data structure of the symptom database is taken, as one example, to be an RDB (Relational Data Base) table format but, not being limited to this, it is also acceptable if it is another data structure, such as a tree structure.

In the heretofore described embodiment, it is presumed that, on a cause of a failure being identified based on incident information, a response method being decided on, and a specific response method being acquired by the failure response support apparatus 100, stopping at notifying the failure response subject apparatus 200 side of the specific response method, an actual failure response is carried out manually by personnel dispatched to the failure response subject apparatus 200 side. However, not being limited to this, it is also acceptable to arrange in such a way that an actual failure response is remotely carried out automatically from the failure response support apparatus 100 side.

Also, it is possible both to manually carry out all or one portion of the processes, among the processes described in the heretofore described embodiment, described as being carried out automatically, and to automatically carry out all or one portion of the processes described as being carried out manually, using a heretofore known method. Apart from this, the process procedures, control procedures, specific names, and information including various kinds of data and parameters shown in the heretofore described embodiment can be optionally changed, unless specified otherwise.

Also, each structural element of each apparatus illustrated having a functional component, it is not essential that it be physically configured as illustrated. That is, a specific format of a dispersion or integration of each apparatus not being limited to that illustrated, it is possible to configure a whole or one portion thereof functionally or physically dispersed or integrated in optional units, in accordance with various kinds of load, usage, or the like.

Furthermore, it is also acceptable that a whole, or one optional portion, of each process function carried out by each apparatus is realized by a CPU (Central Process unit) (or a microcomputer such as an MPU (Micro Process unit) or MCU (Micro Controller Unit)), and a program analyzed and executed by the CPU (or a microcomputer such as an MPU or MCU), or realized as wired logic hardware.

Regarding the program, it not being essential to record it from the outset in an ROM inside a computer, it is also acceptable to arrange in such a way that each program is recorded on a "portable physical medium", such as a flexible disc (FD), a CD-ROM, a DVD, a magneto optical disc, or an IC card, inserted in the computer, or on a "fixed physical medium", such as an HDD, furnished inside or outside the computer, or furthermore, in "another computer (or server)", or the like, connected to the computer via a public line, an internet, a LAN, a WAN, or the like, and the computer retrieves each program from them, and executes it.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification related to a showing of the superiority or inferiority of embodiments of the invention. Although the embodiment(s) of the present invention has been described in detail, it should be understood that the various changes, substitutions, and alterations could be made hereto without departing from the spirit and scope of the invention.

What is claimed is:

1. A recording medium on which is stored a failure response support program which causes a computer apparatus to execute a failure response support process supporting a failure response carried out based on incident information in accordance with a failure of a management subject apparatus, the program causing the computer to execute:

a failure response step management procedure which manages steps of the response to the failure with the incident information;

a response knowledge acquisition procedure which, referring to failure response information in which is described response knowledge corresponding to each step of the response to the failure, acquires response knowledge for the failure by executing (a) a material collection step which collects material necessary for an identification of a cause of the failure from the management subject apparatus, as a first step, (b) a cause identification step which identifies the cause of the failure based on the material collected from the management subject apparatus, as a step following the material collection step, (c) a response determination step which decides on a response to the cause of the failure based on the cause of the failure, as a step following the cause identification step, and (d) a response method acquisition step which acquires a specific response method for the cause of the failure based on the response to the cause of the failure, as a step following the response determination step, wherein the failure response step management procedure determines whether the response knowledge received at the material collection step is sufficient to complete the response knowledge acquisition procedure, and shifts the step of the response to the failure to the cause identification step when the material collection step of the response to the failure receives the response knowledge appropriate to complete the response knowledge acquisition procedure;

wherein material collection knowledge, cause identification knowledge, response determination knowledge, and response method knowledge act as the response knowledge in the material collection step, the cause identification step, the response determination step, and the response method acquisition step respectively in the failure response method information, the program further causing the computer to execute:

a response knowledge process execution procedure which executes a process in accordance with the response knowledge for the failure.

2. The recording medium of claim 1, wherein it is determined whether or not there is enough response knowledge to identify a cause of the failure, and when the response knowledge is insufficient, the subject apparatus identifies and collects further response knowledge to identify the cause of the failure.

3. The recording medium on which is stored the failure response support program according to claim 1, wherein the program further causes the computer apparatus to execute an incident information addition procedure which adds a result of a process by the response knowledge process execution procedure, based on the response knowledge for the failure acquired by the response knowledge acquisition procedure at each step of the response to the failure, to the incident information, and the response knowledge acquisition procedure, referring to the failure response method information based on the incident information of each step of the response to the failure, acquires response knowledge for the failure.

4. The recording medium on which is stored the failure response support program according to claim 1, wherein the response knowledge process execution procedure, as a process according to the response method knowledge acquired at the response method acquisition step, presents the response method knowledge to an operator who carries out the failure response, and the failure response step management procedure, on the response method knowledge being presented to the operator who carries out the failure response by the response knowledge process execution procedure, closes the incident information.

5. A recording medium on which is stored a failure response support program which causes a computer apparatus to execute a failure response support process supporting a failure response carried out based on incident information in accordance with a failure of a management subject apparatus, the program causing the computer to execute:

an incident information generation procedure which generates incident information based on failure information output from the management subject apparatus, in which a failure has occurred;

a material collection procedure which, based on a symptom of the failure included in the incident information generated by the incident information generation procedure, refers to a material collection knowledge database in which (a) the symptom of the failure, and (b) distinguishing information of material necessary for identifying a cause of the failure which brings about the symptom, are stored and correlated, acquires the distinguishing information of the material necessary for identifying the cause of the failure, and collects material corresponding to the acquired material distinguishing information from the management subject apparatus;

a failure cause identification procedure which, based on the symptom of the failure and information relating to the material collected by the material collection procedure, identifies the cause of the failure by referring to a failure cause identification knowledge database in which (a) the symptom of the failure, (b) the information relating to the material collected by the material collection procedure, and (c) the cause of the failure, are stored and correlated;

a response determination procedure which, based on the cause of the failure acquired by the failure cause identification procedure, refers to a response determination knowledge database in which (a) the cause of the failure and (b) a response to the cause of the failure, are stored and correlated, and decides on a response method for the cause of the failure, and a response method acquisition procedure which, based on the response to the cause of the failure decided on by the response determination procedure, refers to a response method knowledge database in which the response to the cause of the failure and a specific response method for the cause of the failure are stored and correlated, and acquires the specific response method for the cause of the failure, wherein the program causes the computer apparatus to determine whether the response knowledge is sufficient to complete the failure cause identification procedure, the response determination procedure, and the response method acquisition procedure received at the material collection procedure, and executing the failure cause identification procedure only when the material collection procedure collects the response knowledge appropriate to complete the failure cause identification procedure, the response determination procedure, and the response method acquisition procedure.

6. The recording medium on which is stored the failure response support program according to claim 5, wherein the program further causes the computer apparatus to execute a cause identification subject failure evaluation procedure which, on the material being collected from the management subject apparatus by the material collection procedure, determines whether or not the failure of the management subject apparatus is a failure for which a cause should be identified, and a failure cause extrapolation procedure which, in the event that it is determined by the cause identification subject failure evaluation procedure that the failure of the management subject apparatus is not a cause identification subject failure for which the cause should be identified, extrapolates the cause of the failure based on the material.

7. The recording medium on which is stored the failure response support program according to claim 5, wherein the program further causes the computer apparatus to execute a specific response method presentation procedure which presents the specific response method for the cause of the failure acquired by the response method acquisition procedure, or a specific response method based on the cause of the failure extrapolated by the failure cause extrapolation procedure, to an operator who carries out the failure response.

8. A failure response support apparatus which supports a failure response carried out based on incident information in accordance with a failure of a management subject apparatus, the apparatus comprising:

an incident information generation unit which generates incident information based on failure information output from the management subject apparatus, in which a failure has occurred;

a material collection knowledge database in which a symptom of the failure, and distinguishing information of material necessary for identifying a cause of the failure which brings about the symptom, are stored and correlated;

a material collection unit which, based on a symptom of the failure included in the incident information generated by the incident information generation unit, refers to the material collection knowledge database, acquires the distinguishing information of the material necessary for identifying the cause of the failure, and collects material corresponding to the acquired material distinguishing information from the management subject apparatus;

a failure cause identification knowledge database in which the symptom of the failure, information relating to the material collected by the material collection unit, and the cause of the failure are stored and correlated;

a failure cause identification unit which, based on the symptom of the failure and the information relating to the material collected by the material collection unit, identifies the cause of the failure by referring to the failure cause identification knowledge database;

a response determination knowledge database in which the cause of the failure and a response to the cause of the failure are stored and correlated;

a response determination unit which, based on the cause of the failure acquired by the failure cause identification unit, refers to the response determination knowledge database, and decides on a response method for the cause of the failure;

a response method knowledge database in which the response to the cause of the failure and a specific response method for the cause of the failure are stored correlated; and a response method acquisition unit which, based on the response to the cause of the failure decided on by the response determination unit, refers to the response method knowledge database, and acquires the specific response method for the cause of the failure, wherein the failure response support apparatus is configured to determine whether the response knowledge is sufficient to operate the failure cause identification unit, response determination unit, and response method acquisition unit received by the material collection unit, and does not shift operation to the failure cause identification unit until the material collection unit has collected the response knowledge appropriate for operation of the failure cause identification unit, the response determination unit, and the response method acquisition unit.

9. The failure response support apparatus according to claim 8, further comprising:

a cause identification subject failure evaluation unit which, on the material being collected from the management subject apparatus by the material collection unit, determines whether or not the failure of the management subject apparatus is a cause identification subject failure for which a cause should be identified, and a failure cause extrapolation unit which, in the event that it is determined by the cause identification subject failure evaluation unit that the failure of the management subject apparatus is not a cause identification subject failure for which the cause should be identified, extrapolates the cause of the failure based on the material.

10. The failure response support apparatus according to claim 8, further comprising:

a specific response method presentation unit which presents the specific response method for the cause of the failure acquired by the response method acquisition unit, or a specific response method based on the cause of the failure extrapolated by the failure cause extrapolation unit, to an operator who carries out the failure response.

11. A failure response support method of a computer which executes a failure response support process supporting a failure response carried out based on incident information in accordance with a failure of a management subject apparatus, the method comprising:

managing steps of the response to the failure with the incident information;

referring to failure response information in which is described response knowledge corresponding to each step of the response to the failure;

acquiring response knowledge for the failure by executing (a) a material collection step which collects material necessary for an identification of a cause of the failure from the management subject apparatus, as a first step, (b) a cause identification step which identifies the cause of the failure based on the material collected from the management subject apparatus, as a step following the material collection step, (c) a response determination step which decides on a response to the cause of the failure based on the cause of the failure, as a step following the cause identification step, and (d) a response method acquisition step which acquires a specific response method for the cause of the failure based on the response to the cause of the failure, as a step following the response determination step;

determining whether the response knowledge received at the material collection step is sufficient to complete the response knowledge acquisition procedure;

shifting the step of the response to the failure to the cause identification step when the material collection step of the response to the failure receives the response knowledge appropriate to complete the acquiring;

wherein material collection knowledge, cause identification knowledge, response determination knowledge, and response method knowledge act as the response knowledge in the material collection step, the cause identification step, the response determination step, and the response method acquisition step respectively in the failure response method information;

the method further comprising:

executing a process in accordance with the response knowledge for the failure.

12. A failure response support apparatus which supports a failure response carried out based on incident information in accordance with a failure of a management subject apparatus, the apparatus comprising:

a storage which stores a material collection knowledge database in which a symptom of the failure, and distinguishing information of material necessary for identifying a cause of the failure which brings about the symptom, are stored and correlated;

a processor which executes a program including a procedure, the procedure comprising:

generating incident information based on failure information output from the management subject apparatus, in which a failure has occurred;

based on a symptom of the failure included in the incident information generated by the generating, referring to the material collection knowledge database, acquiring the distinguishing information of the material necessary for identifying the cause of the failure, and collecting material corresponding to the acquired material distinguishing information from the management subject apparatus;

the storage further storing a failure cause identification knowledge database in which the symptom of the failure, information relating to the material collected by the collecting, and the cause of the failure are stored and correlated, and a response determination knowledge database in which the cause of the failure and a response to the cause of the failure are stored and correlated;

based on the symptom of the failure and the information relating to the material collected by the collecting, identifying the cause of the failure by referring to the failure cause identification knowledge database;

based on the cause of the failure acquired by the identifying, referring to the response determination knowledge database, and deciding on a response method for the cause of the failure;

based on the response to the cause of the failure decided on by the deciding, referring to the response method knowledge database, and acquiring the specific response method for the cause of the failure; and determining whether the response knowledge is sufficient to operate the identifying, the deciding, and the acquiring received by the collecting, and does not shift operation to the identifying until the collecting has collected the response knowledge appropriate for operation of the identifying, the deciding, and the acquiring.

* * * * *